Jan. 16, 1968   J. H. BALLARD ETAL   3,363,843
FLUID INLET DISTRIBUTOR
Filed April 26, 1965   4 Sheets-Sheet 1

INVENTORS
JOHN H. BALLARD
JOHN E. HINES JR.
BY
ATTORNEY

Jan. 16, 1968  J. H. BALLARD ET AL  3,363,843
FLUID INLET DISTRIBUTOR

Filed April 26, 1965  4 Sheets-Sheet 2

INVENTORS
JOHN H. BALLARD
JOHN E. HINES JR.
BY
Milton W. Lee
ATTORNEY

Jan. 16, 1968    J. H. BALLARD ET AL    3,363,843
FLUID INLET DISTRIBUTOR
Filed April 26, 1965    4 Sheets-Sheet 3

INVENTORS
JOHN H. BALLARD
JOHN E. HINES JR.
BY
ATTORNEY 3,363,843
FLUID INLET DISTRIBUTOR
John H. Ballard, Whittier, and John E. Hines, Jr., Newport Beach, Calif., assignors to Union Oil Company of California, Los Angeles, Calif., a corporation of California
Filed Apr. 26, 1965, Ser. No. 450,934
12 Claims. (Cl. 239—504)

This invention relates to apparatus for introducing fluid into the top of a downflow contacting vessel, and more particularly to a fluid influent distributor for installation in the top vertical fluid inlet nozzle of a downflow contacting vessel.

Briefly, the fluid inlet distributor of this invention comprises flow balancing means positioned within the nozzle to effect the distribution of fluid flowing downwardly therethrough symmetrically about the vertical axis of said nozzle, and fluid distributing means positioned within the vessel below the nozzle to receive the symmetrically distributed fluid from the flow balancing means and to disperse this fluid within the vessel in a number of discrete fluid streams of reduced momentum.

The fluid inlet to a typical downflow contacting vessel containing a contacting zone comprising horizontal trays, a packed bed, particulate catalyst bed, or other particle-form solids bed is conventionally through a vertical nozzle located at the center point of the top head of the vessel. The fluid influent entering through the nozzle can be in a gaseous or liquid state, or can be a gas-liquid mixed phase material. The entering fluid either passes directly to the contacting zone, or engages a distribution tray located immediately above the contacting zone which more uniformly distributes the fluid over the upper horizontal surface of the contacting zone. In either case, the fluid enters the vessel at substantial velocity directed downwardly, and impinges with considerable force against the distribution tray or directly on the upper surface of the contacting zone. Where the entering fluid comprises a mixed liquid and gas phase material, the high velocity material impinging against the distribution tray, or top contact tray, can reduce the effectiveness of the tray resulting in poor distribution, particularly of the liquid phase. Similarly, fluid impingement against the upper surface of a particle-form solids bed not only results in non-uniform horizontal distribution, particularly of the liquid portion of the influent material, but also can cause particle migration resulting in attrition of the contact particles and additional channeling.

Further, the fluid influent typically passes through a horizontal run of pipe and a 90 degree elbow positioned immediately above the vertical entry nozzle. In the case of mixed liquid-gas phase influents, the inertia of the fluid flowing at relatively high velocity through the horizontal run of pipe tends to cause the liquid portion of the fluid to continue in a horizontal direction. Thus, as the fluid changes from a horizontal to a vertical flow direction within the elbow, the liquid portion is concentrated at the side of the elbow opposite the horizontal pipe and passes vertically downwardly along the nozzle wall. Since the vertical nozzle often is constructed with a relatively large diameter to permit its use as an entry manway to the vessel during turnaround, the concentration of the liquid portion of the influent material at one side of the nozzle can result in substantial off-center flow within the vessel.

The foregoing problems can be largely minimized by increasing the distance between the nozzle exit and the top of the contact bed, or distribution tray. However, this solution becomes extremely costly in the usual case of large diameter commercial contacting vessels constructed of expensive corrosion-resistant alloys and designed for high temperature and high pressure operation. Thus, it is usually economically desirable to eliminate dead volume in the top of the contacting vessel necessitating that the feed influent enter the vessel relatively close to the top of the contacting zone.

Conventional practice has been to install a solid, usually circular, plate of the approximate diameter of the nozzle in a horizontal position immediately below the inlet nozzle. In such installations, the fluid impinges against the plate and passes outwardly in a generally radial direction toward the vessel wall, impinges against the wall and is directed back toward the center of the vessel. Not only do such installations fail to achieve uniform distribution of the liquid, as liquid flowing downwardly at one side of the nozzle tends to be distributed on that side of the vessel; but also radial flow patterns developed by the impingement plate can result in movement of contact particles from the outer periphery of the contact bed to the center, large mounds of particles accumulating at center of the top surface of the contact bed. Further, the swirling action of the radially flowing fluid frequently results in excessive particle attrition, not only effecting excessive particle loss, but also causing plugging of the particle bed and downstream facilities with fine material.

It is accordingly an object of the present invention to provide an improved fluid influent distributor for downflow contacting vessels. Another object is to improve the distribution of fluid entering a downflow contacting vessel through a top inlet nozzle. Another object is to minimize high velocity impingement of entering fluid on the top surface of the contacting zone, or distribution tray. A further object is to minimize the radial flow of the influent material at the top of the contacting vessel. A still further object is to provide fluid inlet means which permit location of the upper surface of a contacting zone relatively close to the top inlet nozzle. Other and related objects of the invention will be apparent from the following detailed description.

We have found that the foregoing objects and their attendant advantages can be realized by the combination of flow balancing means positioned within the vertical nozzle to correct any asymmetry in the distribution of fluid flowing downwardly through the nozzle, and fluid distributing means located within the vessel immediately below the outlet of the vertical nozzle to divide the downwardly flowing fluid mass into discrete smaller streams of reduced momentum which are distributed within the vessel. The flow balancing means can comprise apparatus to distribute the downwardly flowing fluid, particularly the liquid portion thereof, uniformly over the cross-section of the nozzle to achieve symmetry of flow; or it may comprise apparatus to divert the fluid to the center of the nozzle, the diverted fluid passing to the distribution means as a compact fluid stream symmetrically concentrated at the center of the nozzle. The flow balancing means and fluid distributing means can be constructed as a single unit, which preferably is removably mounted so that the apparatus may be simply and conveniently removed by merely lifting the combined apparatus from its position in the nozzle, thereby providing access through the nozzle to the interior of the vessel.

The apparatus of our invention may be more readily understood by reference to the accompanying drawings of which:

Figure 1:
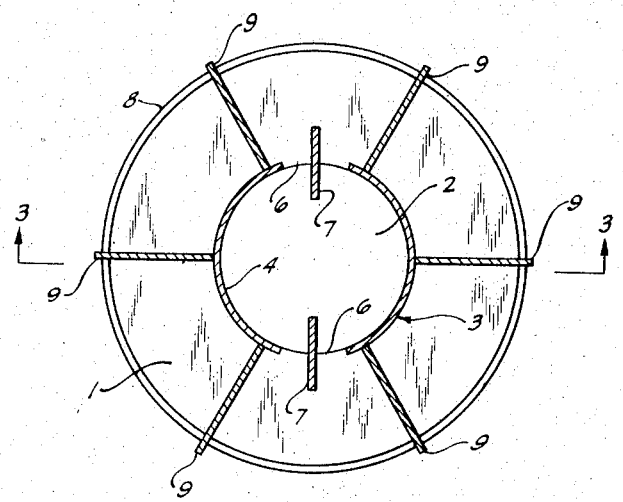
FIGURE 1 is a cross-section view taken along the line 1—1 of FIGURE 2.
Figure 2:
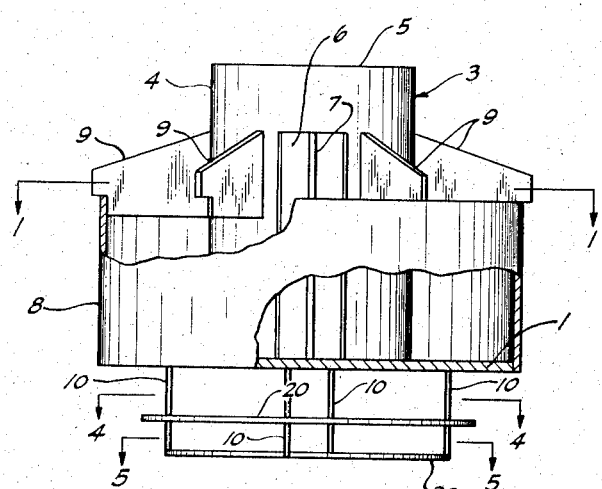
FIGURE 2 is a partially cutaway side view of a combination flow balancing and fluid distributing apparatus.

One embodiment of the integral fluid influent distributor of this invention comprising flow balancing means and fluid distributing means in combination is depicted in FIGURES 1 through 5. The flow balancing means of this embodiment comprise apparatus for concentrating the downwardly flowing fluid uniformly at the center of the vertical nozzle. The basic structure of the flow balancing means includes base plate 1 having a center opening 2 therethrough to permit the flow of fluid downwardly through the nozzle, and chimney 3 attached to and extending vertically upwardly from base plate 1 so as to cover center opening 2. Base plate 1 is a flat plate of size and shape selected to loosely fit within and to substantially cover the horizontal cross-section of the nozzle and, in the usual case, is of circular shape to fit the circular cross-section of the conventional nozzle. When the distribution apparatus is positioned within the nozzle, base plate 1 is in a horizontal position extending substantially across the horizontal cross-section of the nozzle. Excessive clearance between base plate 1 and the nozzle wall is to be avoided so as to mimimize fluid bypass by the distributor, unless other sealing means is provided.

Chimney 3 is a relatively thin-walled, open-bottomed structure of substantially smaller horizontal cross-section than base plate 1, not extending laterally beyond the periphery of the base plate, and comprising side walls 4 and top 5 arranged to enclose an interior chamber. Chimney 3 can comprise a plurality of side walls 4 arranged in a structure of any desired horizontal cross-section, such as a square, a rectangle, a trapezoid, a triangle, etc.; or in the preferred embodiment illustrated in FIGURES 1 through 5, chimney 3 is comprised of a single side wall member formed in the shape of a regular cylinder having a circular horizontal cross-section. In any case, chimney 3 is attached to base plate 1 so as to completely enclose the center opening therein.

Whichever cross-sectional shape is employed, chimney 3 has a plurality of apertures 6 through side walls 4. In the illustrated embodiment, apertures 6 comprise two two vertical slots uniformly disposed 180 degrees apart about the periphery of chimney 3 and extending from the bottom of side wall 4 a substantial distance upwardly. The function of the apertures is to pass the downflowing fluid from the exterior of chimney 3 to the interior thereof, whereupon the fluid passes downwardly through center opening 2 in base plate 1. Vertical baffles 7 comprise flat plates positioned within apertures 6 and fixedly attached to base plate 1 and side wall 4 to aid in the diversion of fluid through the apertures, directing the fluid radially toward the center of chimney 3. Although the illustrated apertures are rectangular slots, any desired aperture configuration can be employed, so long as sufficient flow area is provided. Further, the apertures may be disposed about chimney 3 in any orientation and in the preferred orientation are located uniformly about the periphery. Thus, in the illustrated case of two apertures, the apertures are preferably disposed 180 degrees apart about the periphery; and in the case of three apertures are preferably disposed 120 degrees apart, etc.

The flow balancing means can comprise the aforementioned base plate 1 and chimney 3 in the simplest form, or preferably such assembly can be mounted within outer shell 8 to provide a pan-like structure. Outer shell 8 is a vertical side wall formed to fit the periphery of base plate 1 and is fixedly attached thereto. Although base plate 1 is illustrated attached at the bottom of shell 8, it can be conveniently attached thereto at any point vertically disposed along shell 8, and preferably the point of attachment being such that a pan-like structure is defined by base plate 1 and shell 8 to contain the downwardly flowing fluid. Gusset plates 9 attached to chimney 3 and shell 8 serve as structural members to stiffen the assembly, and also to support the distributor apparatus within the nozzle, the extension of gusset plates 9 beyond outer shell 8 being adapted to rest on a peripheral protruding ring or lip within the nozzle, as will be subsequently described.

One embodiment of fluid distributing means for dispersing the fluid within the vessel comprises a plurality of flat, perforate plates supported in spaced relationship horizontally below base plate 1. In the illustrated embodiment, two circular perforate plates are utilized. Perforate plate 20 is shown supported above plate 30 by means of support members 10. Plate 20 is usually positioned between about 2 and about 12 inches below the terminus of nozzle 40, and plate 30 is usually positioned between about 2 and about 12 inches below plate 20. Preferably, plate 20 is positioned between about 2 and about 6 inches below the terminus of the nozzle and plate 30 is supported between about 2 and about 4 inches below plate 20. In the case of an integral distributor apparatus, it is usually preferable that plates 20 and 30 be of the same or slightly smaller size than base plate 1 so that the apparatus can be easily inserted and removed through the nozzle. Illustrated perforate plate 20 is of slightly smaller diameter than base plate 1 and perforate plate 30 is illustrated of slightly smaller diameter than plate 20.

Figure 4:
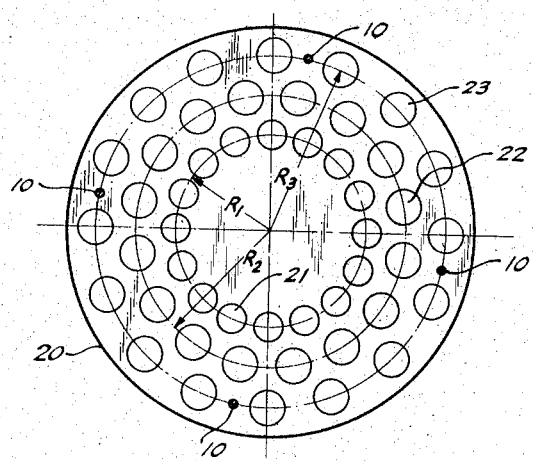
FIGURE 4 is a cross-sectional view showing the upper perforate plate taken along the line 4—4 of FIGURE 2.
Figure 5:
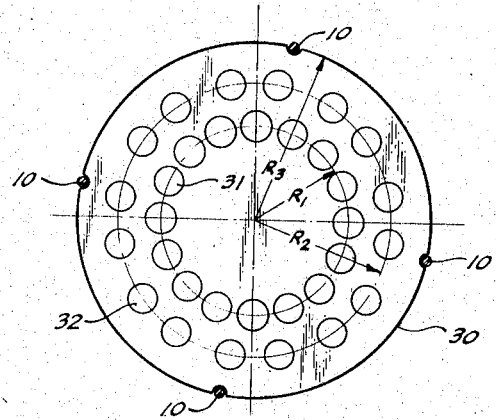
FIGURE 5 is a cross-sectional view showing the lower perforate plate taken along the line 5—5 of FIGURE 2.

Although plates 20 and 30 may be perforated in any convenient manner, improved distribution is obtained when the center fluid impingement area is left unperforated, and when the perforations in each plate are oriented so that fluid passing through the perforations in plate 20 impinge against plate 30, rather than passing directly through the perforations in plate 30. One suitable orientation of perforations to effect such impingement is for the perforations in plate 30 to be aligned directly below a corresponding perforation in plate 20. Preferred perforation patterns for plates 20 and 30 are illustrated in FIGURES 4 and 5, respectively. Upper plate 20 is perforated with an inner row of perforations 21 arranged uniformly in a circular pattern about the center of the plate at radius $R_1$, an intermediate row of perforations 22 at radius $R_2$, and an outer row of perforations 23 at radius $R_3$. Although the perforations may be of any shape and size, for most applications the perforations are preferably circular holes, perforations 21 typically being between about ⅞ inch and about 1½ inches in diameter, and perforations 22 and 23 being slightly larger, having diameters within the range of between about 1 and about 2 inches. Lower plate 30 has two circular rows of equal size perforations, having diameters within the range of between about ¾ inch and about 2 inches, located at radii $R_1$ and $R_2$, respectively. Perforations 31 and 32 are positioned directly below perforations 21 and 22 so that they are in vertical alignment. The radius of plate 30, $R_3$, is the midpoint of the outer circle of perforations 23 of plate 20. Alternatively, radially disposed rectangular slots may be employed in place of the circular holes.

In one specifically preferred fluid distribution means, particularly adapted for use with a vertical nozzle having an inside diameter of 18 inches, upper plate 20 has a diameter of 16 inches and lower plate 30 has a diameter of 14 inches. Perforations 21 are of 1⅛-inch diameter holes arranged in a circular pattern of 3¾-inch radius, and perforations 22 and 23 are 1⅜-inches in diameter and arranged in circular patterns with radii of 5⁷⁄₁₆ and 7 inches respectively. Perforations 31 and 32 are ⅞ inch in diameter and arranged in circular rows having radii of 3¾ and 5⁷⁄₁₆ inches, respectively.

Figure 3:
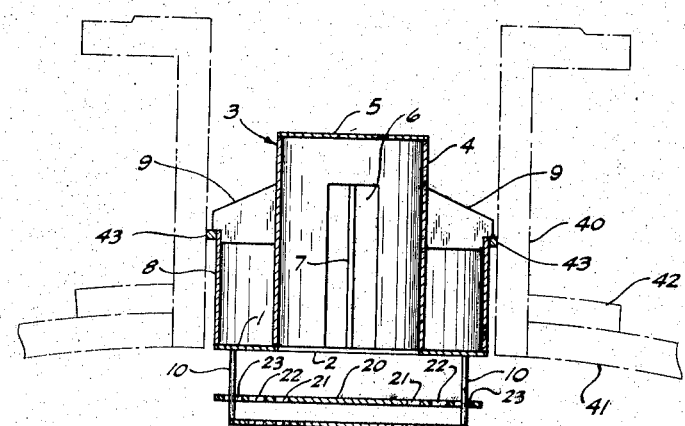
FIGURE 3 is a cross-sectional view taken along the line 3—3 of FIGURE 1 and also showing the apparatus installed in a top nozzle of a contacting vessel.

FIGURE 3 depicts the installation of the aforesaid distributor apparatus within vertical nozzle 40 shown attached to top head 41 of a downflow contacting vessel by means of reinforcing pad 42 and conventional welds. Circular support ring 43 is attached to the inner wall of the nozzle to provide a protruding lip to receive the protruding portion of gusset plates 9, thereby providing the necessary support for the distributor apparatus. The distributor apparatus is supported within nozzle 40 so that plates 1, 20 and 30 are in a horizontal position. Base plate 1 is positioned within the nozzle and plates 20 and 30 are supported from plate 1 in spaced relationship, one above the other, immediately below base plate 1. In the illustrated design incorporating the seal pan formed by outer shell 8, plate 1 can actually be positioned within the vessel below the nozzle, if desired, so long as shell 8 extends upwardly into the nozzle to divert the downflowing fluid through apertures 6 in chimney 3. The apparatus is preferably oriented within the nozzle so that apertures 6 are positioned normal to the direction of flow in the horizontal pipe communicating with nozzle 40 through a 90 degree elbow, not shown. Thus any imbalance in liquid flow tends to be equally distributed between both apertures in chimney 3, rather than being concentrated through only one of the apertures.

The afore-described apparatus functions to effectively introduce a downflowing fluid stream into a contacting vessel. Fluid flowing downwardly through the vertical inlet nozzle is blocked by plate 1 extending across the flow area of the nozzle, and diverted through apertures 6 of chimney 3. The diverted fluid streams entering through the opposed apertures radially enter into the interior chamber of chimney 3 and impinge against each other therewithin, the recombined fluid passing downwardly through opening 2 in plate 1 as a compact stream symmetrically disposed at the center of nozzle 40. The downwardly moving fluid stream impinges on the unperforated center section of plate 20 and is diverted outwardly in a radial direction along the surface thereof. A portion of the fluid passes through perforations 21, 22 and 23, the balance of the fluid passing outwardly about the periphery of plate 20, the liquid portion of the fluid being in the form of dispersed droplets. Most of the fluid passing through perforations 21 and 22 does not pass directly downward to tray 30, but instead possesses an outward radial component of flow so that, for example, the fluid passing through perforations 21 generally strikes tray 30 at a point between perforations 31 and 32, the downwardly flowing material either exiting tray 30 through perforations 21 and 32, or about the periphery of tray 30. The liquid portion of the fluid exiting fluid distributing trays 20 and 30 is divided into droplets and streams of substantially reduced velocity and momentum, and distributed over the distribution tray or upper surface of the contacting bed.

Another embodiment of fluid distributing means comprises a plurality of upwardly dished or concave perforate plates positioned in spaced relationship one above the other immediately below the entry nozzle and adapted to pass all of the entering fluid through the perforations in the dished plates. Although such apparatus can be employed without flow balancing means, superior performance is usually obtained when the liquid portion of the influent fluid is symmetrically distributed about the vertical flow axis of the nozzle. Any means of balancing the liquid flow through the nozzle to obtain substantial symmetry can be employed. For example, the flow centering device of the previously described embodiment can be utilized. However, since the performance of the dished distributing means of this embodiment is not as dependent on flow symmetry of the influent fluid, a simpler flow balancing means can be effectively employed. One particularly convenient flow equalizing device comprises one or more perforate plates positioned in spaced relationship one above the other within the nozzle to substantially uniformly distribute the liquid portion of the downflowing influent fluid over the cross-section of the nozzle.

Figure 7:
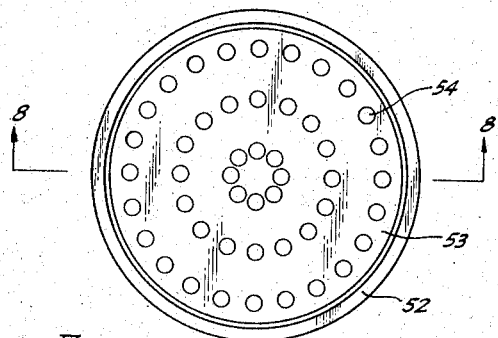
FIGURE 7 is a top view of the apparatus of FIGURE 6.
Figure 6:
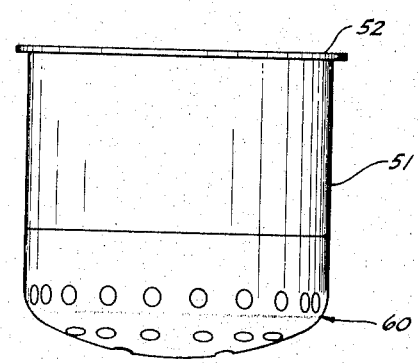
FIGURE 6 is a side view of another embodiment of fluid inlet distributor.

A convenient integral fluid influent distributor for installation in a vertical inlet nozzle of a downflow contacting vessel comprising flow balancing means and dished perforate fluid distributing means in combination is illustrated in FIGURES 6 and 7. The apparatus consists of an outer shell 51 formed to fit within a vertical nozzle and having top lip 52 protruding outside shell 51 and adapted to closely fit the inside wall of the nozzle, thus largely preventing the bypass of fluid around the distributor apparatus and also serving to engage support means for positioning the apparatus in the nozzle. In the usual case, shell 51 will be shaped as a hollow, regular cylinder, and lip 52 as a flat ring. Alternatively, top lip 52 can be constructed to fit the horizontal cross-section of the nozzle and shell 51 can have a square or other selected cross-sectional configuration. Flat, perforate plate 53 is horizontally mounted within shell 51 so as to substantially cover the interior cross-section of the shell. In another modification, plate 53 may be fabricated with a dimension closely fitting within the nozzle and mounted at the top of shell 51, thus serving the combined purpose of balancing the downflowing liquid and engaging the support means in place of lip 52. Perforations 54 comprise a plurality of holes through plate 53 and can substantially cover the surface of plate 53 or can be disposed over a limited portion of the plate. Perforations 54 are preferably circular holes having diameters within the range from about ½ inch to about 1½ inches. In any case, the perforations should be uniformly disposed about the center point of the plate to effect symmetrical distribution of the downflowing fluid, and particularly of the liquid portion of this fluid.

Figure 8:
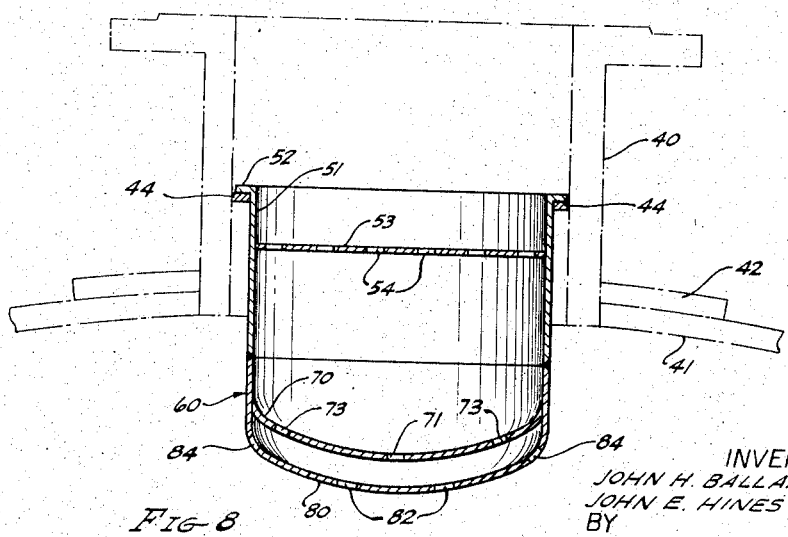
FIGURE 8 is a cross-sectional view taken along the line 8—8 of FIGURE 7 and also showing the apparatus installed in a top nozzle of a contacting vessel.

The bottom of shell 51 is enclosed by fluid distributor 60 which comprises two upwardly concave perforate plates disposed one above the other in spaced relationship and attached to shell 51 about the bottom periphery thereof so as to cause all of the downflowing fluid to pass through the perforations in the dished plates. The construction of fluid distributor 60 and the installation of the completed assembly within typical nozzle 40 is illustrated in FIGURE 8. Nozzle 40 is vertically positioned on vessel top head 41 by means of reinforcing pad 42 and conventional welds. Support means 44 can be pegs or dowels set into nozzle 40 to engage lip 52. Fluid distributor 60 comprises upper dished plate 70 and lower dished plate 80, each having a plurality of perforations therethrough. Although any convenient means of mounting the plates at the bottom of shell 51 may be employed, one simple and convenient construction is depicted in FIGURE 8. Bottom plate 80 is constructed with extended side walls, the open end of the concave plate having the same cross-sectional dimensions as shell 51. Plate 70, having the same peripheral configuration as plate 80, but being slightly smaller in size, is mounted inside of plate 80 by attachment thereto about its periphery so that the perforate portion of plate 70 is maintained in spaced relationship to plate 80. Plate 80 is then attached about its periphery to the bottom periphery of shell 51. In the conventional case in which shell 51 is a regular cylinder, plates 70 and 80 will have circular horizontal cross-sections for proper mating with the shell.

Dished plates 70 and 80 can be of any convenient contoured shape and can be fabricated from standard hemispherical or semi-elliptical heads. Although any perforation pattern can be employed, it is preferred that the perforations be uniformly spaced and that the perforations in plate 70 are offset from those in plate 80 so that a major portion of the fluid passing through the perforations in plate 70 will impinge against plate 80, rather than passing directly through two aligned perforations. The perforations in plates 70 and 80 can comprise circular holes or radially oriented rectangular slots. Preferred perforation patterns for dished plates 70 and 80 are illustrated in FIGURES 9 and 10, respectively.

Figure 9:
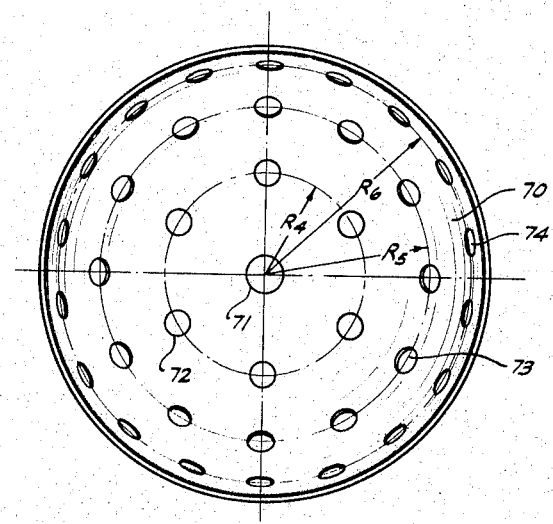
FIGURE 9 is a top view of the upper dished plate of the apparatus.
Figure 10:
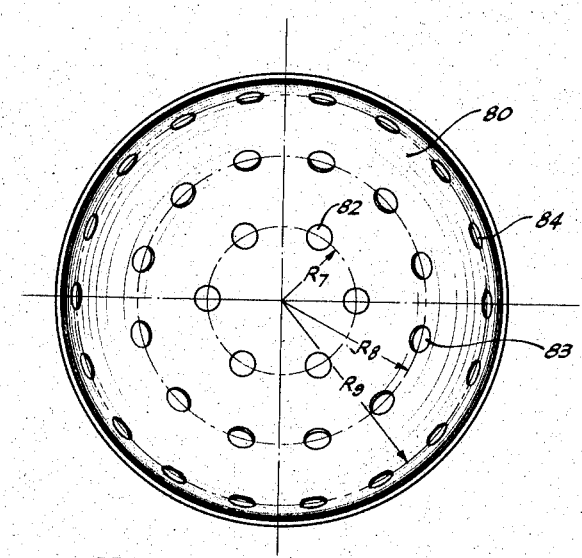
FIGURE 10 is a top view of the lower dished plate of the apparatus of FIGURE 6.

Referring to FIGURE 9, the illustrated preferred perforation pattern for plate 70 comprises a single large diameter perforation 71 located at the center point of the plate with three circular rows of smaller diameter circular holes uniformly disposed therearound. The inner row of six perforations 72 is located at radius $R_4$, an intermediate row of twelve perforations 73 at radius $R_5$ and an outer row of eighteen perforations 74 at radius $R_6$. The preferred pattern for plate 80, illustrated in FIGURE 10, consists of three circular rows of perforations of the same diameter as the outer perforations of plate 70, but without the center perforation. An inner row of six perforations 82 is located at radius $R_7$, an intermediate row of twelve perforations 83 is located at radius $R_8$ and an outer row of perforations 84 is located at radius $R_9$. The perforations in each of the rows are uniformly spaced about the circle, although the angular displacement between perforations in different rows will vary because of the difference in the number of perforations in the various rows. On assembly, the plates are positioned so that the perforations in plate 70 are intermediate between the perforations in plate 80.

In one specifically preferred pattern, particularly adapted for use with a vertical nozzle having a diameter of 18 inches, lower plate 80 has an outside diameter of 17½ inches at its upper, or open, end. Perforation 71 in plate 70 is 1 inch in diameter, and perforations 72, 73 and 74 are ¾ inch diameter holes located in circular rows having radii of $3^{13}/_{16}$, $6^{3}/_{16}$ and 8 inches, respectively. Perforations 82, 83 and 84 in plate 80 are similarly ¾-inch diameter holes and are located in circular rows having radii of $2^{15}/_{16}$, $5^{3}/_{8}$ and 8 inches.

The various parts comprising the distribution apparatus of the invention may be joined in any convenient manner, such as by welding, bolting, screwing, clamping, etc. Because of the durability and low fabrication cost, welding is usually preferred; full seal welds being employed at any point that a fluid-tight joint is desired.

The apparatus may be mounted in the vertical nozzle in any convenient manner so long as the respective horizontal plates are maintained in a substantially horizontal position. Preferably the assembly is supported within the nozzle so as to be conveniently removable, two suitable support means being disclosed herein. Other support devices are equally satisfactory. The fluid distributing means, whether comprising flat perforate plates or dished plates, is preferably installed within the vessel sufficiently below the bottom head that fluid distributed outwardly has an uninterrupted trajectory without impinging against the top head of the vessel. Accordingly, the distance which the fluid distributing means is suspended within the vessel is dependent on the curvature of the top head.

Other and related modifications and variations will be apparent to those skilled in the art, and such are within the scope of the invention as defined by the following claims.

We claim:
1. In combination:
   a downflow contacting vessel of relatively large diameter containing a contacting zone for the contacting of fluids in downflow relationship;
   a vertical fluid inlet nozzle of substantially smaller diameter than said vessel located at the top of said contacting vessel above said contacting zone to provide fluid communication from the exterior of said vessel to the interior thereof;
   a horizontal base plate of a size and configuration to substantially cover the horizontal cross-section of said nozzle, said plate having a center opening therethrough;
   a vertical chimney of substantially smaller cross-section than said nozzle having side walls and a closed top, said chimney being attached to and extending upwardly from said base plate so as to cover said center opening, and said side walls having a plurality of apertures uniformly located about the periphery of said chimney;
   means for removably supporting said base plate in a horizontal position within said nozzle;
   a plurality of flat, perforate plates; and
   means for supporting said perforate plates in spaced relationship one above the other in a horizontal position within said vessel immediately below said nozzle so that at least a portion of the fluids flowing downwardly through said nozzle will pass outwardly around the periphery of said perforate plates.
2. The device defined in claim 1 wherein said base plate is circular to fit within a nozzle having a circular horizontal cross-section.
3. The device defined in claim 1 including a vertical outer shell defining the periphery of said base plate, said base plate being attached to said shell so as to form a pan-like structure.
4. The device defined in claim 1 wherein each of the perforations in said lower perforate plate are aligned directly below perforations in said upper perforate plate.
5. The device defined in claim 1 wherein said apertures in said chimney are two vertical slots disposed 180 degrees about the periphery of said chimney, said slots extending from the bottom of said chimney a substantial distance upwardly therefrom.
6. The device defined in claim 5 including a vertical baffle positioned within each of said vertical slots, said baffles being oriented normal to the wall of said chimney so as to divert fluid through said slot and into said chimney.
7. A fluid inlet distributor for installation within the top vertical cylindrical nozzle of a downflow contacting vessel which comprises:
   a base plate having a circular shape and size to substantially cover the horizontal cross-section of said cylindrical nozzle, said plate having a circular center opening therethrough;
   a hollow cylinder having a smaller diameter than said nozzle attached to and extending upwardly from said base plate so as to cover said center opening, said cylinder having two vertical slots disposed 180 degrees about the periphery of said chimney, said slots extending from the bottom of said cylinder a substantial distance upwardly;
   a vertical baffle positioned at the midpoint of each of said vertical slots, said baffles being oriented normal to the wall of said cylinder and extending through said slot on either side of said cylinder wall so as to divert fluid through said slot to the interior of said cylinder;
   an outer vertical cylindrical shell defining the periphery of said circular base plate and attached to said base plate at the periphery thereof so as to form a pan-like structure;
   two perforate plates having diameters not exceeding the diameter of said base plate;
   first support means attached to said base plate for supporting said perforate plates in spaced relationship one above the other below said base plate; and
   second support means for supporting said distributor within said nozzle so that said base plate is horizontally positioned therewithin and said perforate plates are suspended within said vessel below said nozzle.
8. In combination:
   a downflow contacting vessel of relatively large diam- eter containing a contacting zone for the contacting of fluids in downflow relationship;

a cylindrical vertical fluid inlet nozzle of substantially smaller diameter than said vessel located at the top of said contacting vessel above said contacting zone to provide fluid communication from the exterior of said vessel to the interior thereof;

a hollow cylinder having an outside diameter only slightly smaller than the inside diameter of said cylindrical nozzle;

flow balancing means positioned within said cylinder to effect the distribution of fluid flowing downwardly through said nozzle substantially symmetrically about the vertical axis of said cylinder;

a first upwardly concave perforate plate having an outside diameter equal to the inside diameter of said cylinder and attached in a horizontal position at the bottom of said cylinder below said flow balancing means;

a second upwardly concave perforate plate having a diameter equal to the diameter of said cylinder and attached to said cylinder in spaced relationship below said first perforate plate; and means for supporting said cylinder within said nozzle so that said first and second perforate plates are positioned within said vessel below said nozzle.

9. The device defined in claim 8 wherein said flow balancing means comprises one or more flat perforate plates mounted in spaced relationship horizontally one above the other within said cylinder.

10. The device defined in claim 8 wherein the perforations in said first and said second upwardly concave perforate plate are oriented so that the perforations in said second plate are not directly aligned with the perforations in said first plate.

11. In combination:
a downflow contacting vessel of relatively large diameter containing a contacting zone for the contacting of fluids in downflow relationship;

a vertical fluid inlet nozzle of substantially smaller diameter than said vessel located at the top of said contacting vessel above said contacting zone to provide fluid communication from the exterior of said vessel to the interior thereof;

flow balancing means removably positioned within said nozzle to cause the fluid flowing downwardly through said nozzle to be symmetrically distributed about the vertical axis of said nozzle; and fluid distributing means supported from said flow balancing means and positioned within said vessel below said nozzle to receive said symmetrically distributed fluid from said flow balancing means and to disperse said fluid within said vessel in a number of discrete fluid streams of reduced momentum.

12. The device defined in claim 11 wherein said fluid distributing means comprise two upwardly concave perforate plates attached to said flow balancing means, said plates being supported in spaced relationship one above the other within said vessel below said nozzle so as to cause substantially all of said downflowing fluid to pass first through the perforations of said upper plate, and then through the perforations of said lower plate.

References Cited

UNITED STATES PATENTS

| | | | |
|---|---|---|---|
| 418,477 | 12/1889 | Strebeck | 239—504 |
| 2,541,854 | 2/1951 | Bachli | 239—428.5 |
| 2,633,343 | 3/1953 | Aghnides | 239—428.5 |
| 2,713,895 | 7/1955 | Eckstron | 239—504 |
| 2,717,772 | 9/1955 | Palivos | 239—428.5 |

EVERETT W. KIRBY, *Primary Examiner.*

M. HENSON WOOD, JR., *Examiner.*